United States Patent
Kemp et al.

(10) Patent No.: US 6,818,129 B2
(45) Date of Patent: Nov. 16, 2004

(54) ION EXCHANGE REMOVAL OF METAL IONS FROM WASTEWATER

(75) Inventors: Philip M. Kemp, Jefferson Township, PA (US); James L. Filson, Wexford, PA (US); Stanley R. Kaars, Gibsonia, PA (US); Frank L. Sassaman, Jr., Franklin Township, PA (US)

(73) Assignee: USFilter Corporation, Warrendale, PA (US)

( * ) Notice: Subject to any disclaimer, the term of this patent is extended or adjusted under 35 U.S.C. 154(b) by 0 days.

(21) Appl. No.: 10/017,077

(22) Filed: Dec. 14, 2001

(65) Prior Publication Data

US 2002/0104803 A1 Aug. 8, 2002

Related U.S. Application Data

(62) Division of application No. 09/113,982, filed on Jul. 10, 1998, now Pat. No. 6,346,195.

(51) Int. Cl.⁷ .................................................. C02F 9/00
(52) U.S. Cl. ........................................ 210/251; 210/284
(58) Field of Search ................................ 210/251, 269, 210/284, 912; 438/692, 693

(56) References Cited

U.S. PATENT DOCUMENTS

| | | | |
|---|---|---|---|
| 2,271,482 A | 1/1942 | Hoelkeskamp et al. | 23/55 |
| 3,301,542 A | 1/1967 | Medford, Jr. et al. | 266/12 |
| 3,428,449 A | 2/1969 | Swanson | 75/117 |
| 3,440,036 A | 4/1969 | Spinney | 75/117 |
| 3,658,697 A | 4/1972 | Huether | 210/18 |
| 3,870,033 A | 3/1975 | Faylor et al. | 126/360 |
| 3,873,581 A | 3/1975 | Fitzpatrick et al. | 260/370 |
| 3,912,801 A | 10/1975 | Stephens | 423/8 |
| 3,914,374 A | 10/1975 | Koehler et al. | 423/25 |
| 3,923,741 A | 12/1975 | Asano et al. | 260/561 N |

(List continued on next page.)

FOREIGN PATENT DOCUMENTS

| | | | |
|---|---|---|---|
| EP | 0 761 603 | 3/1997 | ........... C02F/1/463 |
| JP | 55062794 | 5/1980 | |
| JP | 06121978 | 5/1994 | ............. C02F/1/28 |
| JP | 08024897 | 1/1996 | ............. C02F/9/00 |
| JP | 08039054 | 2/1996 | ............. C02F/1/28 |
| JP | 08141579 | 6/1996 | ............. C02F/1/58 |
| JP | 09117763 | 5/1997 | ............. C02F/1/44 |
| JP | 10111387 | 4/1998 | ......... G21C/19/307 |
| WO | WO 97/29048 | 8/1997 | ............. C02F/1/28 |

OTHER PUBLICATIONS

"A Circuit Board Manufacturer's Solution to Wastewater Treatment" Electronic Packaging and Production, vol. 35, No. 9 01.08 1995 p. 85.

O'Mara & Assoc., Sec. 4–IC Planarization by Chemical Mechanical Polishing, pp. 4–32–4–34.

(List continued on next page.)

*Primary Examiner*—Ivars C. Cintins
(74) *Attorney, Agent, or Firm*—Lowrie, Lando & Anastasi, LLP

(57) ABSTRACT

A novel process and apparatus are disclosed for cleaning wastewater containing metal ions in solution, hydrogen peroxide, and high solids, e.g., greater than about 50 mg/l particulate solids. A carbon adsorption column removes hydrogen peroxide in the wastewater feed containing high solids. A ion exchange unit removes the metal ions from solution. The process and apparatus remove metal ions such as copper from a high solids byproduct polishing slurry from the chemical mechanical polishing (CMP) of integrated circuit microchips to form an environmentally clean wastewater discharge.

7 Claims, 6 Drawing Sheets

U.S. PATENT DOCUMENTS

| | | | |
|---|---|---|---|
| 3,928,192 A | | 12/1975 | Katzakian, Jr. et al. ........ 210/30 |
| 3,941,837 A | | 3/1976 | Asano et al. ........... 260/561 N |
| 3,959,129 A | | 5/1976 | White et al. .................... 210/28 |
| 3,985,648 A | * | 10/1976 | Casolo ........................ 210/669 |
| 4,010,099 A | | 3/1977 | Leach et al. ................... 210/21 |
| 4,070,281 A | | 1/1978 | Tagashira et al. ............. 210/26 |
| 4,210,530 A | | 7/1980 | Etzel et al. ................ 210/38 B |
| 4,231,888 A | | 11/1980 | Dalton ........................ 252/182 |
| 4,303,704 A | | 12/1981 | Courduvelis et al. ........ 427/345 |
| 4,329,210 A | | 5/1982 | Merchant et al. ........... 204/107 |
| 4,569,769 A | | 2/1986 | Walton et al. ............... 210/759 |
| 4,629,570 A | | 12/1986 | Kennedy, Jr. ............... 210/666 |
| 4,666,683 A | | 5/1987 | Brown et al. ................. 423/24 |
| 5,045,213 A | | 9/1991 | Bowers ....................... 210/709 |
| 5,149,437 A | | 9/1992 | Wilkinson et al. .......... 210/665 |
| 5,225,087 A | | 7/1993 | Kardos ........................ 210/713 |
| 5,256,187 A | | 10/1993 | Gefvert ........................ 75/717 |
| 5,298,168 A | | 3/1994 | Guess ......................... 210/713 |
| 5,346,627 A | | 9/1994 | Siefert et al. ............... 210/729 |
| 5,348,588 A | * | 9/1994 | Winston ...................... 134/10 |
| 5,348,712 A | | 9/1994 | Marquis et al. ............... 423/22 |
| 5,348,724 A | | 9/1994 | Hagimori et al. ........... 423/531 |
| 5,437,797 A | * | 8/1995 | Helmig ....................... 210/669 |
| 5,464,605 A | | 11/1995 | Hayden ...................... 423/579 |
| 5,476,883 A | | 12/1995 | Abe et al. ................... 523/310 |
| 5,558,775 A | | 9/1996 | Busch, Jr. ................... 210/638 |
| 5,599,515 A | | 2/1997 | Misra et al. ................ 423/101 |
| 5,616,790 A | | 4/1997 | Arnold et al. .............. 562/444 |
| 6,106,728 A | * | 8/2000 | Iida et al. ................... 438/692 |

OTHER PUBLICATIONS

"Treatment and Water recycling of Copper CMP Slurry Waste Streams to Achieve Environ–mental Compliance for Copper and Suspended Solids," Mary Reker et al., *Semiconductor Fabtech–8th Edition*, (8 pages total).

"Manufacturability of the CMP Process" Malik et al., Thin Solid Films 270 (1995) pp. 612–615.

Rohm and Haas "Helpful Hints in Ion Exchange Technology" Robert Kunin, Sep. 1981, IE–73–63–74, (8 Pages total).

"Industrial Wastewater Treatment by Granular Activated Carbon" Donald G. Hager, *Industrial Water Engineering*, Jan./Feb. 1974, pp. 14–28.

Lewatit®—The Use of Ion Exchange for the Polishing of Water Martinola et al. Bayer, Paper given at the VGB conference in Essen, Oct. 1985, (43 pages total).

* cited by examiner

ION EXCHANGE REMOVAL OF METAL IONS FROM WASTEWATER

The patent application is a Division of prior, U.S. patent application Ser. No: 09/113,982, filed Jul. 10, 1998, now U.S. Pat. No. 6,346,195.

BACKGROUND OF THE INVENTION

1. Technical Field

This invention relates to a process and apparatus for removing metal ions from wastewater. In one aspect, this invention relates to a process and apparatus for removing copper ions from wastewater from a chemical mechanical polishing (CMP) of integrated circuit microchips.

2. Background

Semiconductor microelectronic chip (microchip) manufacturing companies have developed advanced manufacturing processes to shrink electronic circuitry on a microchip to smaller dimensions. The smaller circuitry dimensions involve smaller individual minimum feature sizes or minimum line widths on a single microchip. The smaller minimum feature sizes or minimum line widths, typically at microscopic dimensions of about 0.2–0.5 micron, provide for the fitting of more computer logic onto the microchip.

An advanced new semiconductor manufacturing technology involves the use of copper in place of aluminum and tungsten to create a copper microchip circuitry on a silicon wafer. The copper has an electrical resistance lower than aluminum, thereby providing a microchip which can operate at much faster speeds. The copper is introduced to ULSI and CMOS silicon structures and is utilized as interconnect material for vias and trenches on these silicon structures.

ULSI silicon structures are Ultra Large Scale Integration integrated circuits containing more than 50,000 gates and more than 256K memory bits. CMOS silicon structures are Complimentary Metal Oxide Semiconductor integrated circuits containing N-MOS and P-MOS transistors on the same substrate.

For fully integrated multi-level integrated circuit microchips, up to 6 levels, copper now is the preferred interconnect material.

A chemical mechanical polishing (CMP) planarization of copper metal layers is used as a part of the advanced new semiconductor manufacturing technology. The chemical mechanical polishing (CMP) planarization produces a substrate working surface for the microchip. Current technology does not etch copper effectively, so the semiconductor fabrication facility tool employs a polishing step to prepare the silicon wafer surface.

Chemical mechanical polishing (CMP) of integrated circuits today involves a planarization of semiconductor microelectronic wafers. A local planarization of the microchip operates chemically and mechanically to smooth surfaces at a microscopic level up to about 10 microns ($\mu$m). A global planarization of the microchip extends above about 10 microns ($\mu$m) and higher. The chemical mechanical polishing planarization equipment is used to remove materials prior to a subsequent precision integrated circuit manufacturing step.

The chemical mechanical polishing (CMP) planarization process involves a polishing slurry composed of an oxidant, an abrasive, complexing agents, and other additives. The polishing slurry is used with a polishing pad to remove excess copper from the wafer. Silicon, copper, and various trace metals are removed from the silicon structure via a chemical/mechanical slurry. The chemical/mechanical slurry is introduced to the silicon wafer on a planarization table in conjunction with polishing pads. oxidizing agents and etching solutions are introduced to control the removal of material. Deionized water rinses often are employed to remove debris from the wafer. Ultrapure water (UPW) from reverse osmosis (RO) and demineralized water also can be used in the semiconductor fabrication facility tool to rinse the silicon wafer.

INTRODUCTION TO THE INVENTION

The chemical mechanical polishing (CMP) planarization process introduces copper into the process water, and governmental regulatory agencies are writing regulations for the discharge of wastewater from the chemical mechanical polishing (CMP) planarization process as stringently as the wastewater from an electroplating process, even though CMP planarization is not an electroplating process.

The copper ions in solution in the wastewater must be removed from the byproduct polishing slurry for acceptable wastewater disposal.

The chemical mechanical polishing planarization of the microchip produces a byproduct "grinding" (polishing) slurry wastewater which contains copper ions at a level of about 1–100 mg/l. The byproduct polishing slurry wastewater from the planarization of the microchip also contains solids sized at about 0.01–1.0 $\mu$m at a level of about 500–2000 mg/l (500–2000 ppm).

An oxidizer of hydrogen peroxide ($H_2O_2$) typically is used to help dissolve the copper from the microchip. Accordingly, hydrogen peroxide ($H_2O_2$) at a level of about 300 ppm and higher also can be present in the byproduct polishing slurry wastewater.

A chelating agent such as citric acid or ammonia also can be present in the byproduct polishing slurry to facilitate keeping the copper in solution.

A chemical/mechanical slurry wastewater will discharge from the chemical mechanical polishing (CMP) tool at a flow rate of approximately 10 gpm, including rinse streams. This chemical/mechanical slurry wastewater will contain dissolved copper at a concentration of about 1–100 mg/l.

Fabrication facilities operating multiple tools will typically generate a sufficient quantity of copper to be an environmental concern when discharged to the fabrication facility's outfall. A treatment program is needed to control the discharge of copper present in the copper CMP wastewater prior to introduction to the fabrication facility's wastewater treatment system.

A conventional wastewater treatment system at a semiconductor fabrication facility often features pH neutralization and fluoride treatment. An "end-of-pipe" treatment system typically does not contain equipment for removal of heavy metals such as copper. An apparatus and method for providing a point source treatment for copper removal would resolve a need to install a costly end-of-pipe copper treatment system.

Considering equipment logistics as well as waste solution characteristics, a point source copper treatment unit is needed which is compact and which can satisfy the discharge requirements of a single copper CMP tool or a cluster of copper CMP tools.

Ion exchange technology is effective for concentrating and removing low levels of contaminants from large quantities of water. Ion exchange also has been employed effectively in wastewater treatment for removal of specific contaminants. For ion exchange to remove specific contaminants from wastewater economically, it is often important to utilize a selective resin or create an ionic selectivity for the specific ion that has to be removed.

Many ion exchange resin manufacturers developed selective resins during the 1980's. These ion exchange resins received wide acceptance because of their high capacity and high selectivity over conventional cation and anion resins for certain ions.

Cation selective resins have demonstrated their ablity to remove transition metals from solutions containing complexing agents such as gluconates, citrates, tartrates, and ammonia. These selective resins are called chelating resins, whereby the ion exchange sites latch onto the transition metal. The chelating resin breaks the chemical bond between the complexing agent or a weaker chelating chemical.

The conventional cation resins have a much greater difficulty in removing specific metals from waste streams that are chelated or contain complexing agents. The conventional resins exhibit low or no capacity for removing heavy metals in the presence of complexing or chelating compounds.

The ion exchange resin is used to pull the copper ions out of solution.

Brown, U.S. Pat. No. 4,666,683; Etzel et al., U.S. Pat. No. 4,210,530; Merchant, U.S. Pat. No. 4,329,210; and Gefart, U.S. Pat. No. 5,256,187 disclose removing copper by ion exchange.

If hydrogen peroxide ($H_2O_2$) is present, the ion exchange resin will be oxidized, and the resin structure is broken down. Accordingly, hydrogen peroxide can not be present in an ion exchange unit operation because the ion exchange resin is incompatible with hydrogen.

Hayden, U.S. Pat. No. 5,464,605, discloses removing peroxides from liquids by activated carbon.

Koehler et al., U.S. Pat. No. 3,914,374, disclose removing residual copper from acid nickel solutions by activate carbon which absorbs the copper.

Asano et al., U.S. Pat. No. 3,923,741, in Example 3 pass a copper solution through a granular active carbon column. Flow resistance is measured and reported. The solution then is passed through an ion exchange resin column. (U.S. Pat. No. 3,923,74, Col. 6, lines 35–65.)

U.S. Pat. Nos. 5,476,883, 3,923,741, and 3,941,837 teach precipitating copper ions in wastewater solutions using a carbon column and ion resin exchange beds. In U.S. Pat. No. 5,476,883, copper is removed by strongly acidic cation exchange resin. (Col. 11, lines 36–52.) Example 8 sets up a Calgon CPG coal-based activated carbon column followed by ion exchange resin. (Col. 12, lines 55–67.) Peroxide concentrations are disclosed in Table 2.

Ion exchange can be used to attach copper ions, but would not be likely to work on a byproduct polishing slurry because of the quantities of solids coming in with the byproduct polishing slurry in the form of a silica, alumina slurry.

Conventional pretreatment practice for granular activated carbon beds also principally requires the removal of contaminants such as excess amounts of suspended solids. Suspended solids, including bacteria, in amounts exceeding about 50 mg/l are required to be removed prior to operating the carbon bed.

Ion exchange resin suppliers and equipment manufacturers strongly advise that particle controls ahead of, i.e., upstream from, ion exchange bed systems are an essential aspect of an effective pretreatment system.

According to Bayer, the feed to the ion exchange resin bed should be as free as possible of suspended solids.

Particles of suspended solids bind up the ion exchange resin beds. The resin acts as a filter to retain the particles. The suspended solids accumulate and cause an increase in pressure drop across the resin bed. When this increased pressure drop occurs, the water is forced to take the path of least resistance and circumvents or flows around the resin bed. This resin circumvention is called channeling. When the process water flows down the sides of the column, a large portion of the resin is bypassed, limiting the contact between the resin and the process water, resulting in high contaminant leakage and poor bed capacity. Under extreme conditions, internal distributors and collectors can break due to the high pressure drop.

An ion exchange bed that is loaded with solids is difficult to regenerate. The regenerant solution takes the path of least resistance and channels down the sides of the column resulting in incomplete regeneration of the resin.

According to Rohm and Haas, the feed must be relatively free from suspended solids and colloidal material. The suspended solids and colloidal matter will form a mat at the surface of the bed. Pressure drop increases, channeling is encountered, and portions of the bed are by-passed. The suspended solids and colloidal matter also coat the beads and granules of the ion exchange resin, reducing the rate of diffusion of ion in and out of the exchanger particle. It is therefore important that all feeds be clarified as much as possible to remove the last traces of suspended solids or colloidal matter. Coagulation sedimentation, and filtration are the normal clarifying methods.

The byproduct polishing slurry wastewater containing copper ions from the CMP of semiconductor microelectronic chips containing copper can be passed through a microfilter to remove the solids in the form of the silica, alumina slurry. The permeate from the microfilter containing permeate copper ions then can be contacted with the ion exchange resin to attach the copper.

Further according to Rohm and Haas, pretreatment of the feed also should remove or neutralize traces of soluble constituents that may degrade or foul the exchanger, e.g., traces of oxygen, ozone, chlorine, and other oxidants.

Wastewaters from non-copper CMP processes are generally discharged to the semiconductor fabrication facility end-of-pipe where the wastewater is neutralized prior to discharge. With the advent of copper technology, these slurry wastewaters will contain copper.

Copper present in the fabrication facility outfall can pose problems. Some fabrication facilities must control the amount of suspended solids in the out fall. Accumulation in the receiving POTW's (Publicly Owned Treatment Works) sludges result in increased cost for municipal sludge disposal and environmental concerns to eliminate copper in the municipal sludge.

Bio-toxicity problems in the municipal biological systems are caused by mass loading of copper.

Environmental discharge limits for copper result in non-compliance at the fabrication facility.

A process and apparatus are needed to remove the copper from the waste slurries near the point of generation and permit a copper-free waste to pass to discharge and neutralization in the conventional manor.

A process and apparatus are needed to remove copper ions from solution for acceptable wastewater disposal of byproduct polishing slurries containing high amounts of suspended solids and to remove the copper ions from solution containing high amounts of suspended solids efficiently and economically.

It is an object of the present invention to provide a novel process and apparatus for removing metal ions from solution.

It is an object of the present invention to provide a novel process and apparatus for removing metal ions from solutions containing high amounts of suspended solids.

It is an object of the present invention to provide a novel process and apparatus for removing copper ions from solution.

It is an object of the present invention to provide a novel process and apparatus for removing copper ions from solutions containing high amounts of suspended solids.

It is an object of the present invention to provide a novel process and apparatus for removing copper ions from solution from a byproduct polishing slurry for acceptable wastewater disposal.

Another object of the present invention is to provide a novel process and apparatus for removing copper ions from solution from a byproduct polishing slurry from the chemical mechanical polishing (CMP) of integrated circuits.

It is a further object of the present invention to provide a novel process and apparatus for removing copper ions from solutions containing high amounts of suspended solids economically and efficiently.

These and other objects and advantages of the present invention will become more apparent to those skilled in the art in view of the following detailed description and the accompanying drawings.

SUMMARY OF THE INVENTION

The process and apparatus of the present invention remove metal ions from wastewater by providing a first step carbon adsorption bed for receiving a wastewater feed containing metal ions in solution, wherein the wastewater feed contains solids sized in the range of about 0.01–1.0 μm in an amount higher than about 50 mg/l, in combination with providing a second step ion exchange unit operation for receiving a carbon bed product stream from the carbon adsorption bed and for removing the metal ions from solution. The process and apparatus of the present invention remove metal ions from wastewater containing solids in an amount higher than about 100 mg/l, e.g., by way of example in an amount in the range of about 500–2000 mg/l.

A wastewater feed containing hydrogen peroxide and metal ions in solution is passed to the carbon column to reduce the concentration of the hydrogen peroxide and form a carbon bed effluent having concentration levels of hydrogen peroxide less than about 1 mg/l (1 ppm), preferably less than about 0.1 mg/l (0.1 ppm). In one aspect, the metal ions are copper ions. In one aspect, the metal ions are copper ions at a concentration level in the range of about 1–100 mg/l.

The ion exchange unit operation includes means for contacting copper ions in the carbon bed product stream with a chelating ion exchange resin to adsorb the copper ions. In one aspect, the chelating ion exchange resin includes a macroporous iminodiacetic functional group. In one embodiment, the chelating ion exchange resin includes cross-linked polyethylene resin.

The process and apparatus of the present invention operate to remove metal ions from a wastewater from a byproduct polishing slurry. In one embodiment, the process and apparatus of the present invention operate to remove metal ions, e.g., such as copper metal ions, from a wastewater from a byproduct polishing slurry from the chemical mechanical polishing (CMP) of integrated circuit microchips to attach the metal ions and form an environmentally clean water discharge product.

DETAILED DESCRIPTION

The process and apparatus of the present invention provide for a removal of metal ions through a combination of steps including passing a wastewater solution containing metal ions first through a carbon adsorption column, preferably without prior micro-filtration or ultra-filtration removal of suspended solids, to remove hydrogen peroxide ($H_2O_2$) catalytically and then contacting the wastewater solution containing metal ions with an ion exchange resin to remove the metal ions from solution.

Solids are defined herein using Standard Methods 302 A, Preliminary Filtration for Metals (1985, 16$^{th}$ ed.).

In one aspect, the process and apparatus of the present invention provide a novel process and apparatus for the removal of copper ions including passing a wastewater solution containing copper ions first through a carbon column, preferably without prior micro-filtration or ultra-filtration removal of silica, alumina slurry solids, to remove the hydrogen peroxide ($H_2O_2$) catalytically and then contacting the wastewater solution containing copper ions with a chelating ion exchange resin to attach the copper.

In one embodiment, the process and apparatus of the present invention provide a novel apparatus and process for the removal of copper ions including passing a wastewater solution containing copper ions first through a carbon adsorption column, preferably without prior micro-filtration or ultra-filtration removal of silica, alumina slurry solids, to remove catalytically the hydrogen peroxide ($H_2O_2$) and then contacting the wastewater solution containing copper ions with a chelating ion exchange resin of iminodiacetic functional group to attach the copper.

The process and apparatus of the present invention provide a novel process and apparatus for the removal of copper ions from a byproduct polishing slurry wastewater solution containing copper from the chemical mechanical polishing (CMP) of integrated circuits of semiconductor microelectronic chips.

Figure 1:
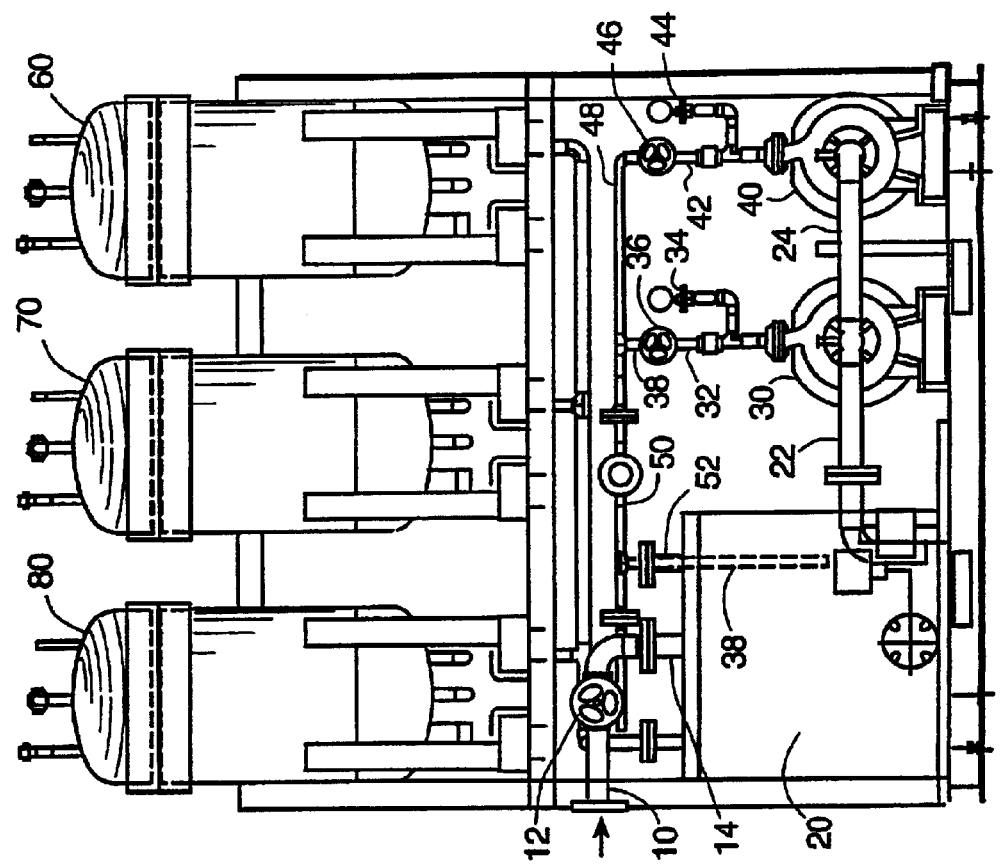
FIG. 1 is a front elevational process equipment schematic of the process and apparatus of the present invention.

Referring now to FIG. 1, a front elevational process equipment schematic is shown of the metal ion removal process and apparatus of the present invention. A copper CMP wastewater 10 is received from a CMP tool (not shown) by gravity in a collection tank 20. A chemical mechanical polishing (CMP) planarization tool, e.g., such as in an integrated circuit microchip fabrication facility, discharges the wastewater stream 10 containing metal ions in solution, e.g., such as copper ions in solution. The wastewater stream 10 passes through a manual isolation feed valve 12 and a collection tank inlet line 14 to enter the collection tank 20.

The copper CMP wastewater 10 containing copper ions also contains hydrogen peroxide at levels up to about 300 ppm and higher. The hydrogen peroxide is used as an oxidizer to help solubilize the copper from the microchip. The wastewater stream 10 containing copper ions and hydrogen peroxide also contains suspended solids, e.g., such as silica, alumina slurry solids, at nominal particle diameter sizes of about 0.01–1.0 $\mu$m and at a concentration level above 50 mg/l (50 ppm), e.g., by way of example at a concentration level in the range of about 500–2000 mg/l (500–2000 ppm).

The collection tank 20 has a nominal retention time of 10 minutes at an influent flow rate of 10 gpm. The copper CMP wastewater contains oxidizers, dissolved copper, copper etchants, alumina particles, silica particles, and some times a corrosion inhibitor. These copper CMP wastewater constituents are contained in a background of deionized (DI) water. The following constituents are common, including dissolved copper, total suspended solids, oxidizing agents, etchants, complexing agents, DI water background 99%+, TDS 800, pH 6 to 7.

The copper CMP wastewater passes from the collection tank 20 in line 22 and line 24 to a pump 30 and a pump 40, respectively. The pumps 30 and 40 provide a duplex pumping station or transferring the wastewater through lines 32 and 42, respectively, at pressures indicated by pressure gauges 32 and 44, through throttling valves 36 and 46, and through lines 38 and 48 to main line 50 at a flow rate of 15 gpm. Five gallons per minute pass in line 52 and are diverted back to the collection tank 20. The remainder of the waste stream (10 gpm) is directed to the process equipment. The 5 gpm of recirculated water maintains a high velocity in the feed tank collection tank 20, which minimizes solids accumulation.

The recirculated water in line 52 can also receive an injection of mineral acid if the CMP tool is shut down for an extended period of time. A proportional pH meter maintains the pH of the wastewater during these excursions. Normal operation of the Copper removal/recovery system does not require pH control.

Figure 2:
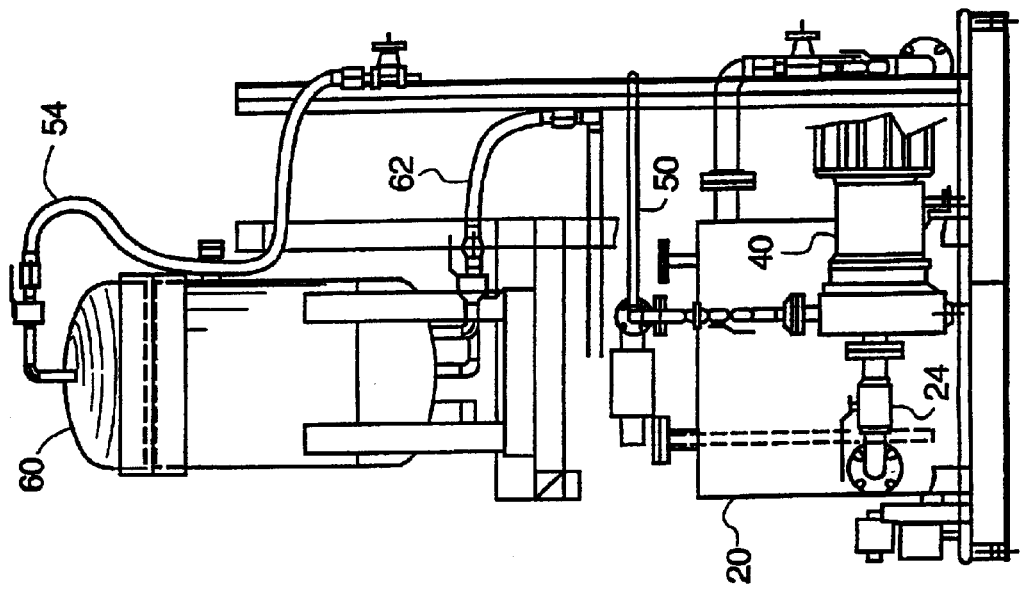
FIG. 2 is a right side elevational process equipment schematic of the process and apparatus of the present invention.

Referring now to FIG. 2, a right side elevational process equipment schematic is shown of the metal ion removal process and apparatus of the present invention.

The wastewater stream in line 50 is passed in line 54, provided by a flexible hose made of a material such a stainless steel nylabraid, to the top of a carbon column 60. Th e wastewater in line 54 flows at 10 gpm to a peroxide removal pretreatment in carbon column 60. The carbon column 60 contains a specialized coarse grade of activated carbon. The activated carbon is used to remove the hydrogen peroxide. The peroxide pretreatment column is replaced every three months with a fresh column. The carbon column 60 contains granular activated carbon particles sized in the range of about 8×40 mesh. A suitable carbon is 8×30 mesh acid washed available from U.S. Filter Westates Carbon-Arizona Inc. in Parker, Ariz. The hydrogen peroxide of the wastewater stream 54 passes down-flow in the carbon column 60 and is adsorbed onto the granular activated carbon in the carbon column 60.

Figure 3:
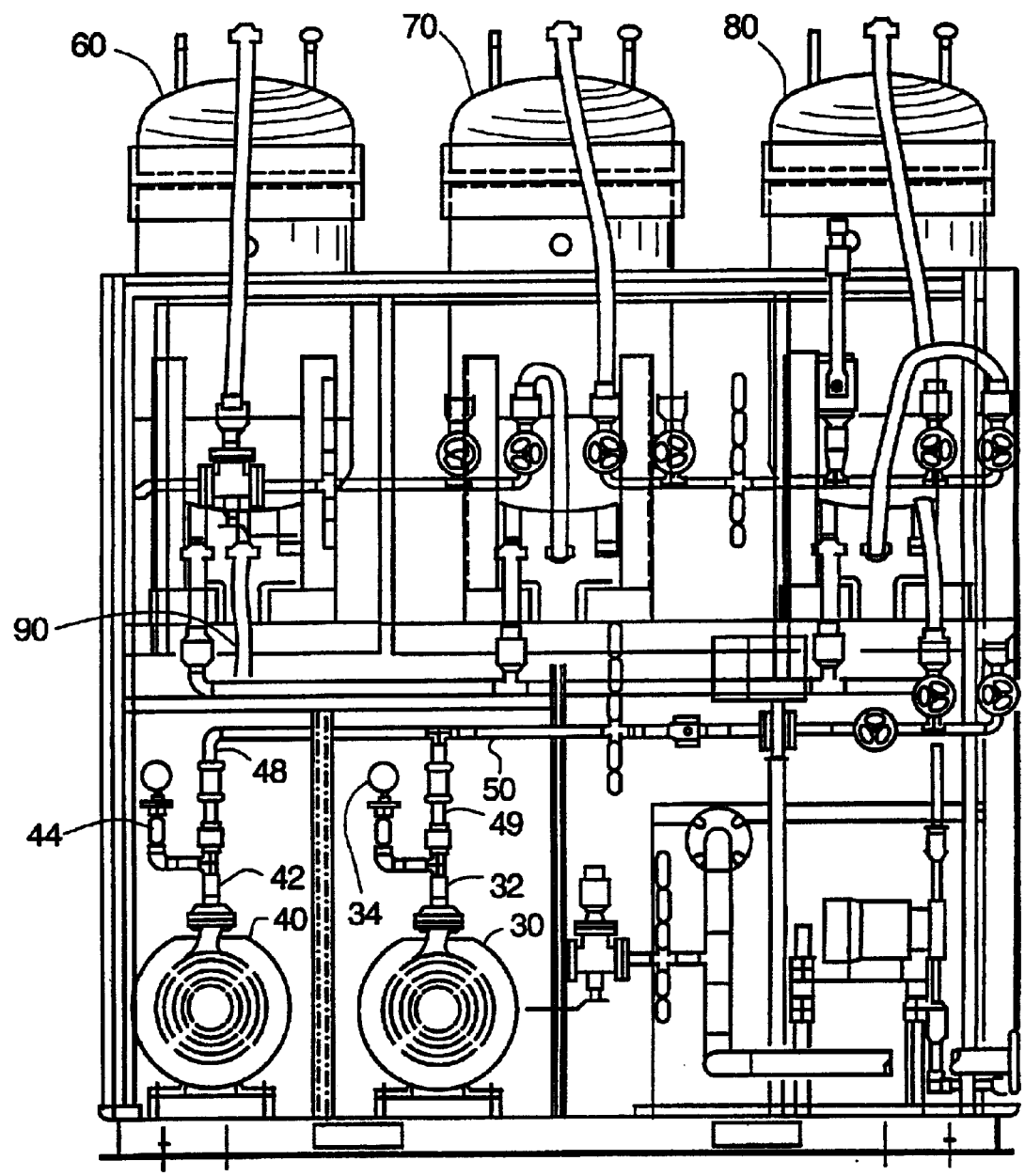
FIG. 3 is a rear elevational process equipment schematic of the process and apparatus of the present invention.
Figure 5:
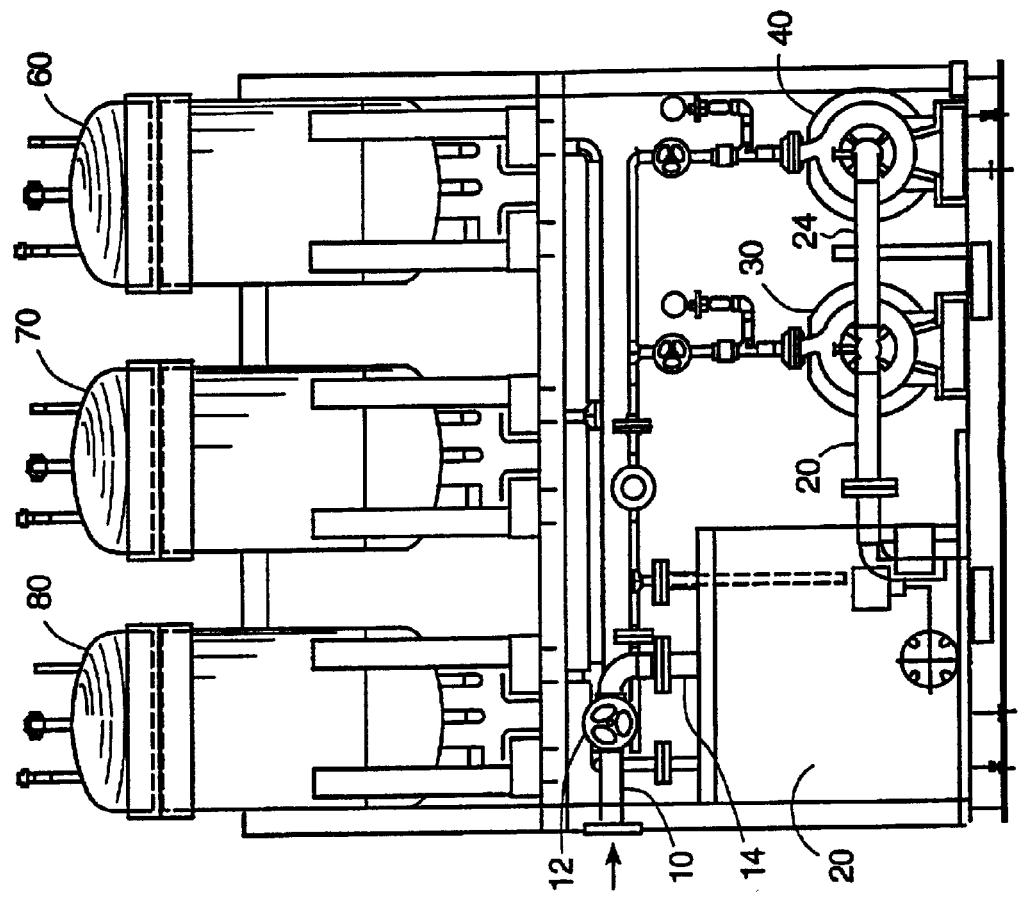
FIG. 5 is a front elevational process equipment schematic of the process and apparatus of the present invention.

Referring now to FIG. 3, a rear elevational process equipment schematic is shown of the process and apparatus of the present invention. Following the carbon bed treatment step in carbon column 60, a carbon column product stream 62 containing copper ions in solution and grinding (polishing) solids from the carbon column 60 is passed to an ion exchange copper scavenging column 70. The ion exchange copper scavenging column 70 contains a specialized copper scavenging resin that features particle grading that is used to control the resin bead size and maintain a minimum uniformity coefficient.

The specialized resin system removes the copper and allows the particulate to pass through to the discharge. The resin system features two ion exchange columns 70 and 80 in series. A worker (ion exchange column 70), polisher (ion exchange column 80) arrangement allows for maximum loading of the copper on the resin.

The primary or worker ion exchange resin ion exchange column 70 is replaced every 17 to 18 days of continuous operation. The lag or polisher ion exchange column 80 is placed in the primary position, and a freshly regenerated column is placed in the polishing position. The spent ion exchange column is conditioned and regenerated off site at a licensed service facility provided by U.S. Filter Wastewater Group, Inc. of Warrendale, Penn. A RCRA part B facility is utilized for resin regeneration in the event that the resin is considered a hazardous waste.

Environmentally clean wastewater slurry passes through wastewater ion exchange bed discharge 90 to a municipal drain.

The copper is removed from the resin during the conditioning and regeneration procedure. The copper is then recovered as elemental copper and re-sold to the wood preservative or metals industry.

The copper recovery system (CRS) technology treats a continuous flow of wastewater without a system shutdown or an interruption of the flow. The effluent from CRS feeds the suspended solid removal system (SSRS).

The product water from CRS enters the SSRS collection tank where the waste stream receives an injection of a chemical coagulant. The coagulant feed is optional. The coagulant is used to greatly enhance the recovery rate of the subsequent microfilter. If, however, the intention is to diacharge the copper free solids system for subsequent discharge to the Publicly Owned Treatment Works (POTW), then a high microfilter is not desirable.

A nominal 80% recovery for the microfilter is established. The remaining 20%, resulting from the reject flow, is used to carry away the solids. In such a case, the coagulant feed system can be eliminated.

If it is desirable to eliminate TSS in the reject from the microfilter, a chemical coagulant is utilized. Again the coagulant has the effect of greatly improving the microfilter recovery rate and increasing the flux. The concentrated, copper-free solids are fed to a filter press for de-watering. A recovery rate greater than 95% is achievable. The remaining 5% microfilter blow down is easily de-watered in the filter press.

The product water from the microfilter is received in a collection tank. The tank serves as a break tank and supplies water to the RO feed pumps. The RO feed pumps provide the feed pressure required for the reverse osmosis system.

The re-pressurized feed water to the RO unit enters a bank of RO membranes. The RO membranes are used to remove dissolved solids to prepare the water for reclaiming in the fabrication facility.

Figure 4:
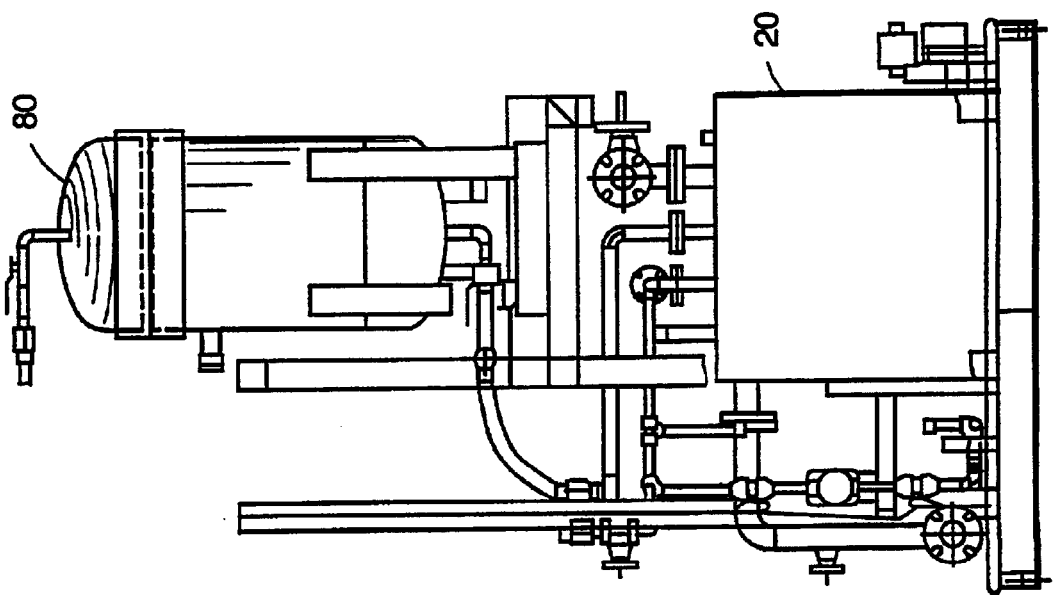
FIG. 4 is a left side elevational process equipment schematic of the process and apparatus of the present invention.

Referring now to FIG. 4, a left side elevational process equipment schematic is shown of the process and apparatus of the present invention.

Figure 6:
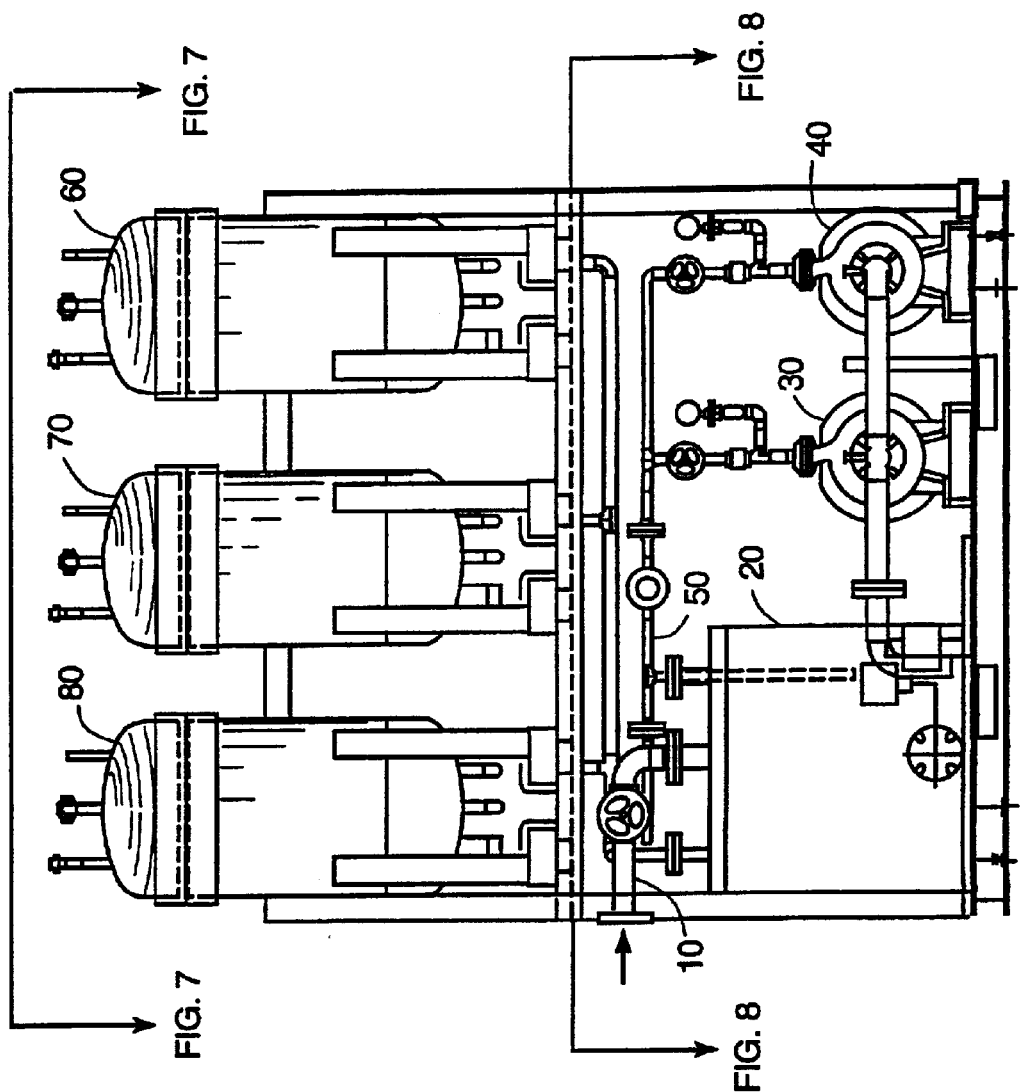
FIG. 6 is a front elevational process equipment schematic of the process and apparatus of the present invention.
Figure 7:
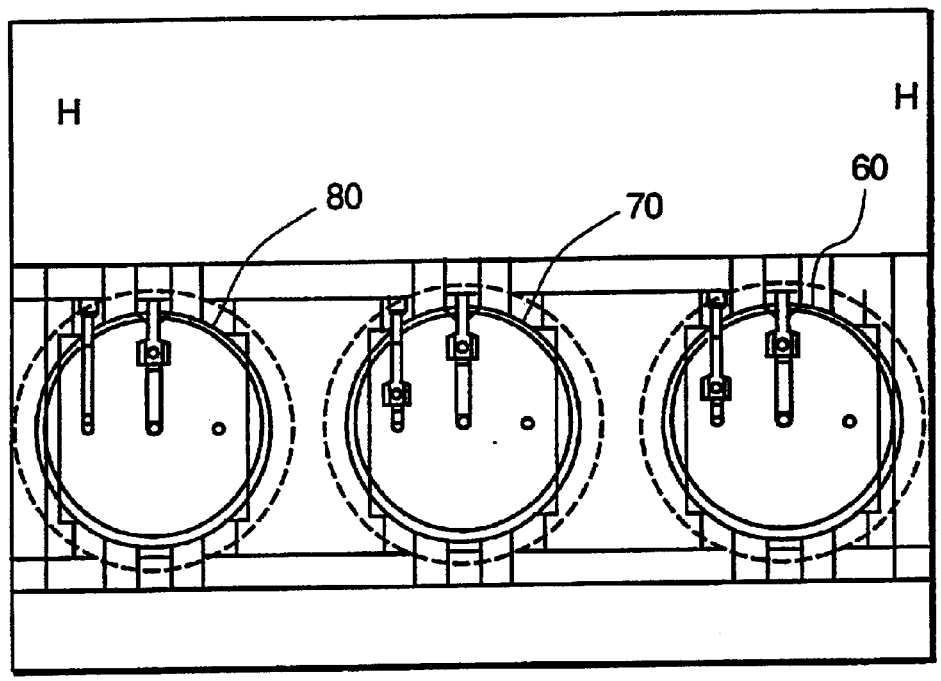
FIG. 7 is a top plan view of the process equipment schematic of the process and apparatus of the present invention, taken along view 7—7.

FIGS. 6 and 7 show a front elevational process equipment schematic of the process and apparatus of the present invention.

Referring now to FIG. 7, a top plan view is shown of the process equipment schematic of the process and apparatus of the present invention, taken along view 7—7.

Figure 8:
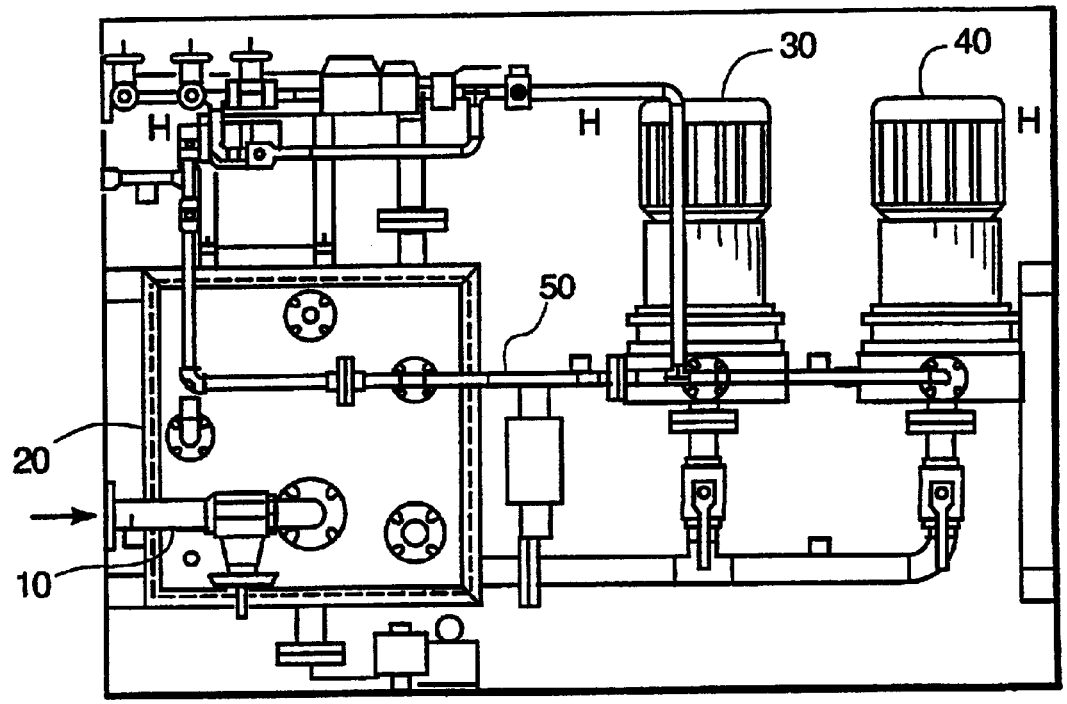
FIG. 8 is a top plan view of the process equipment schematic of the process and apparatus of the present invention, taken along view 8—8.

Referring now to FIG. 8, a top plan view is shown of the process equipment schematic of the process and apparatus of the present invention, taken along view 8—8.

Copper CMP wastewater contains oxidizers, dissolved copper, copper etchants, alumina particles, silica particles and sometimes a corrosion inhibitor. These constituents are contained in a background of deionized water. The following constituent concentrations are common.

| Dissolved copper | 5.0 mg/l |
|---|---|
| Total suspended solids | 1000.0 mg/l |
| Oxidizing agents | 300.0 mg/l |
| Etchants | 200.0 mg/l |
| Complexing agents | 400.0 mg/l |
| DI water background | 99% + |
| TDS | 800 |
| pH | 6 to 7 |

Oxidizers such as nitric acid, hydrogen peroxide, ferric nitrate, and ammonium persulfate are chemicals for enhancing the copper corrosion rate of a slurry. Other complexing agents such as citric acid or ammonium hydroxide help to etch the copper.

When the resin is laden with copper, the resin is regenerated with mineral acid to remove the copper. It is important to establish a reversible reaction and remove the copper from the spent resin. Replacement cost of chelating resin to be supplied for each loading cycle would be prohibitive.

Sulfuric acid is the acid of choice for conventional resin regeneration. Sulfuric acid is less costly than other mineral acids such as hydrochloric or nitric acid. Another major benefit from sulfuric acid regeneration resides in the ability to easily electrowin the copper from the spent acid following regeneration of the chelating resin. The elemental copper from the electrowinning process could then be sold as scrap metal with a minimal environmental liability.

It has been found empirically that the ion exchange resin in the process and apparatus of the present invention preferably is not regenerated with sulfuric acid. It has been found empirically that the combination of alumina, silica, and sulfate in the process and apparatus of the present invention become cemented together.

The resin column in the process and apparatus of the present invention was practically solidified during regeneration with sulfuric acid.

It has been found empirically that the ion exchange resin in the process and apparatus of the present invention preferably is regenerated with hydrochloric acid.

The ion exchange resin in the process and apparatus of the present invention preferably is regenerated with hydrochloric acid, even though it is problematic to electrowin copper from the hydrochloric acid regenerant solution, and even though chlorine gas is a by-product from this electrowinning operation.

It has been found that a service-based ion exchange process and apparatus of the present invention is preferred for removing copper from CMP slurry from the manufacture of microchips. The service-based ion exchange process and apparatus of the present invention have been found to recover the copper with specialized recovery technology HTMR (High Temperature Metal Recovery). The service-based ion exchange process and apparatus of the present invention have been found to recover the hydrochloride regenerant solution with distillation.

The combination of silica particles, alumina particles, and sulfates has been found to be a problem in regeneration of the ion exchange resin when using sulfuric acid.

In anticipation of difficult electrowinning operations in a field application using hydrochloric acid, and to provide a minimum liability to the microchip manufacturer, a service-based process and apparatus are preferred. The preferred method provides for the recovery of the ion exchange resin loaded with copper, provides for the recovery of copper, and provides for the recovery of hydrochloric acid regenerant.

The resin is regenerated at the TSDF (Treatment Storage and Disposal Facility) using recovered hydrochloric acid. The copper chloride then is sold as a by-product, and the hydrochloric acid is recovered in an acid recovery unit operation. Alternatively, the copper is precipitated as a metal hydroxide and then recovered in an HTMR High Temperature Metal Recovery operation as elemental copper.

The ion exchange resin of the process and apparatus of the present invention preferably is a chelating ion exchange resin. The chelating ion exchange resin of the process and apparatus of the present invention preferably has a high degree of cross-linking. The cross-linking increases chemical resistance to oxidizers. The chelating ion exchange resins of the process and apparatus of the present invention can isolate the copper from complexing agents and most chemical chelants. High concentrations of oxidizers such as hydrogen peroxide need to be removed in a pretreatment step.

The chelating ion exchange resins of the process and apparatus of the present invention have an operating capacity in the range of about 1.5 to 2.0 pounds/ft$^3$ of copper. A minimum operating capacity for the chelating resin is about 1.5 pounds/ft$^3$ of copper.

Copper can be taken up by the resin in the process and apparatus of the present invention at a low pH. It has been found that the process and apparatus of the present invention preferably is positioned on-site at the copper CMP tool facility to avoid aging of the copper CMP wastewater slurry containing copper. In the event of such an on-site process and apparatus of the present invention, the pH may be maintained near neutral. For aged copper CMP wastewater slurry feed solution, a pH of about 2 to 3 provides a good copper uptake on the resin the process and apparatus of the present invention.

The chelating ion exchange resin of the process and apparatus of the present invention provides a tight uniformity coefficient of 1.7 maximum. The ion exchange resin of the process and apparatus of the present invention is screened to control bead size. Bead size control is necessary to minimize suspended solids build up in the bed. The ion exchange resin of the process and apparatus of the present invention has the following minimum specifications.

| | |
|---|---|
| Bead size min. 90% | 0.4–1.23 mm |
| Effective size | 0.55 (± 0.55) mm |
| Uniformity coefficient | 1.7 |
| Bulk weight (± 5%) | 800 g/l |
| Density | 1.18 g/ml |
| Water retention | 50–55 wt % |
| pH range | 0–14 |
| Functional group | iminodiacetic |
| Structure | macroporous |
| Matrix | crosslinked polystyrene |
| Minimum Capacity | 2.7 mg/l in H$^+$ Form |

The ion exchange resin of the process and apparatus of the present invention provides a controlled bead size because of a sieving process. A tight control of bead size eliminates undesirably small beads and resin fines which could eventually trap suspended solids.

The ion exchange resin of the process and apparatus of the present invention provides a higher operating capacity of the iminodiacetic resins evaluated.

The ion exchange resin of the process and apparatus of the present invention is manufactured by the thalamid functionalization process. The thalamid functionalization process reduces the resin's environmental toxicity. It is preferred not to use chloromethylene to functionalize the groups of the ion exchange resin of the process and apparatus of the present invention. Chloromethylene has been labeled as a carcinogen.

A multiple copper CMP tool cluster generates about 100 gpm of wastewater. The wastewater can be fed by gravity to an influent collection tank having a retention time, e.g., of about 10 minutes. The collected CMP wastewater can be pressurized in a lift station prior to feeding to the process and apparatus of the present invention.

Prior to an actual reduction to practice, it was thought that the silica, alumina slurry solids of the copper CMP slurry would foul the bed and plug the carbon column in a matter of hours.

However, it has been found that the process and apparatus of the present invention operate unexpectedly without fouling and have been observed to run for 10 days and more with no pressure increase and no plugging. The hydrogen peroxide ($H_2O_2$) is decomposed catalytically in the carbon column.

It has been found that the process and apparatus of the present invention efficiently remove hydrogen peroxide ($H_2O_2$) and dissolved copper ions from a byproduct "grinding" (polishing) slurry wastewater from the metal chemical mechanical polishing (CMP) of integrated circuits, including high speed semiconductor integrated circuit microelectronic chips containing copper metal.

EXAMPLE I

A treatability study was conducted on a series of polishing wastes from a variety of chemical mechanical polishing (CMP) operations for producing integrated circuit semiconductor microelectronic chips. Treatments were performed on the copper CMP polishing wastes received from various integrated circuit semiconductor microchip manufacturers. Treatments were performed on the copper CMP polishing wastes to investigate and determine copper removal from an alumina slurry.

A novel method and apparatus provided a first step carbon adsorption removal of hydrogen peroxide from a wafer CMP planarization polishing waste combined with a second step using ion exchange to remove complexed copper in the wafer planarization polishing waste. The wafer planarization polishing waste contained many particulate alumina solids which otherwise, i.e., if not for the copper, could be disposed via a municipal drain or sewer.

Samples used during this Example were copper CMP wastes associated with computer microchip manufacturing. Several samples were used in the testing.

Table 1 lists the samples.

TABLE 1

| Samples Received | |
|---|---|
| Source | Label |
| A | CMP Waste |
| B | CMP Waste |
| C | CMP Waste |

The carbon used during all carbon column testing was Calgon RX 8×40 mesh (Lot 04033) available from Calgon Carbon Co. in Pittsburgh, Pa. A suitable equivalent carbon is 8×30 mesh acid washed available from U.S. Filter Westates Carbon—Arizona Inc in Parker Ariz. The carbon was prepared by degassing and rinsing. Prior to the experimental, the carbon was conditioned by mixing in deionized water for ten minutes to allow for degassing and cleaning. The carbon was allowed to settle, and the suspended fines were decanted off with the supernatant. This conditioning was repeated until the supernatant was clear and colorless with no visible suspensions.

For column loading, the conditioned carbon was slurried and poured into a Plexiglas column having dimensions of about 1 inch diameter and 60 inches height. The final bed depth of the carbon was 36 inches. Deionized water was put through the column counter-currently to classify the carbon and remove any residual carbon dust.

Three samples were put through the carbon column, "A," "B," and "C," representing different manufacturing companies and separate facilities. One of the samples used during this test was "A" slurry previously concentrated using a Membralox Silver-back® microfilter purification system available commercially from U.S. Filter Wastewater Group, Inc. in Warrendale, Penn. The concentrate was re-diluted with deionized water simulate "as-received" characteristics.

Hydrogen peroxide was added to all of the slurry samples to accurately simulate expected concentrations of about 400 mg/l (400 ppm) total.

The CMP slurry solutions containing hydrogen peroxide were passed through the carbon filter bed without prior removal of any of the alumina, silica particles in the CMP slurry solutions. During this stage of experimental, an influent pressure and a hydrogen peroxide content were monitored.

A peristaltic pump was used to transfer the sample from a 55 gallon drum into the carbon column. The flow rate was monitored to be consistent throughout the experimental testing.

During the course of the experimental testing operation, it was noted that gas bubbles would be forced out through the bottom effluent tube column rather than gassing up through the top of the carbon bed. This was consistent throughout the experimental testing.

Early in the experimental, the flow was stopped overnight. Several times the upper portion of the carbon bed would be dry. Retaining a higher liquid head space prior to shutting of the pump eliminated this undesired condition. It is believed that gassing continued while stationary, and subsequently the liquid volume would fall.

After an initial period of time, an ammonium citrate/copper solution was added to the slurry.

Table 2 summarizes the results of the carbon column testing.

TABLE 2

Carbon Column Testing

| Bed Volumes | Inlet Pressure | Feed H2O2 | Effluent H2O2 | Influent Cu | Effluent Cu |
|---|---|---|---|---|---|
| 8 | <1 | — | — | <1 | — |
| 40 | <1 | 428 | <1 | <1 | — |
| 50 | <2 | — | <1 | <1 | — |
| 80 | 2.75 | 420 | <1 | <1 | — |
| 115 | 2.2 | — | <1 | <1 | — |
| 123 | <2 | — | <1 | <1 | — |
| 164 | 2.2 | — | <1 | <1 | — |
| Citric Acid/Copper added | | | | | |
| 172 | <2 | — | <1 | 6.9 | — |
| 204 | <2 | — | <1 | — | 0.35 |
| 212 | <2 | — | — | — | — |
| 370 | <2 | — | <1 | — | — |
| 520 | <2 | 412 | — | — | 5.16 |
| New feed ("A" slurry + H2O2 + Cu) | | 400 | | | |
| 529 | <2 | — | <1 | — | — |
| 544 | <2 | — | <1 | — | — |
| 592 | <2 | — | <1 | — | 7.4 |
| 650 | <2 | — | <1 | — | 7.6 |
| 663 | <2 | — | <1 | — | — |
| 694 | <2 | — | <1 | — | 7.1 |
| 710 | <2 | — | <1 | — | — |
| 726 | <2 | — | — | — | — |
| 742 | <2 | — | <1 | — | — |
| 758 | <2 | — | — | — | — |
| 766 | <2 | — | — | — | — |
| 774 | <2 | — | <1 | — | — |
| 790 | <2 | — | — | — | — |
| 806 | <2 | — | — | — | — |
| 822 | <2 | — | <1 | — | — |
| 838 | <2 | — | — | — | — |
| 864 | <2 | — | — | — | — |
| 880 | <2 | — | <1 | — | — |
| 896 | <2 | — | <1 | — | — |
| 912 | <2 | — | — | — | — |
| 936 | <2 | — | <1 | — | — |
| 944 | <2 | — | <1 | — | — |
| 952 | <2 | — | — | — | — |
| 968 | <2 | — | <1 | — | — |
| 984 | <2 | — | — | — | — |
| 1000 | <2 | — | <1 | — | — |

The results of Table 2 showed that carbon could remove hydrogen peroxide from CMP slurry solutions without entrapping the alumina, silica particles within the filter bed.

EXAMPLE II

Ion exchange tests were performed to remove copper from the alumina slurry without removing the slurry itself. Ion exchange tests were performed using iminodiacetic resin, a selective resin for heavy metal ion removal. The resins were conditioned prior to operation to be in the monosodium form as follows:

Backwash for 30 minutes to classify resin
Sulfuric Acid—6 lb/ft$^3$
Rinse with 20 bed volumes deionized water
Sodium Hydroxide—1 lb/ft$^3$
Rinse with 20 bed volumes deionized water Six (6) ion exchange tests were performed using the conditioning model listed above.

All tests were performed at 1 gpm/ft$^3$ in co-current downflow mode. The length of operation was varied.

A first stage carbon column had the general characteristics: 1"×24" glass column before the second stage of ion exchange resin, 18" of conditioned resin.

The carbon column effluent was piped directly to the ion exchange column.

Table 3 summarizes the analytical results of this test.

TABLE 3

| Bed Volumes | Inlet Pressure | Influent Cu | Effluent Cu |
|---|---|---|---|
| 8 | <1 | — | — |
| 12 | <1 | — | — |
| 16 | <1 | 0.35 | 0.14 |
| 28 | <1 | — | — |
| 30 | <1 | 0.35 | 0.14 |
| 38 | <1 | — | — |
| 46 | <1 | — | — |
| 54 | <1 | 0.46 | 0.12 |
| 62 | <1 | — | — |
| 70 | <1 | — | — |
| 78 | <1 | — | — |
| 160 | <1 | 3.3 | 0.9 |
| 200 | <1 | 5.16 | 1.38 |
| 216 | <2 | 9.85 | 2.42 |
| 232 | <2 | 7.12 | 5.12 |

The results showed an early break through of copper which was identified as caused by the monosodium conditioning of the resin.

After a substantial amount of carbon column effluent had been put through the ion exchange bed, regeneration was attempted. The column was first back washed with 2 liters of deionized water to remove residual solids from the resin bed. The expansion of the bed during backwash reached 80%. The regeneration cycle consisted of 485 ml of 4% sulfuric acid introduced in counter-current up-flow mode.

During regeneration, the following details were noted:

The resin "rocks up." Blue chunks form upon introduction of acid and do not break up easily.

Many fine white solids emerge from the resin which were not evident in the backwash.

Rinsing with 1 liter of deionized water did not loosen the "rocks."

The regenerant was analyzed and found to contain 18% of the copper loaded onto the column.

An additive without slurry was tested to confirm that the resin would remove copper from the complexed solution without solids present.

The feed for the experimental was prepared by adding 20 ml of ammonium citrate/copper solution per gallon of deionized water.

General Characteristics: 1"×24" glass column, 18" of conditioned resin.

Table 4 summarizes the analytical results of this test.

TABLE 4

| Bed Volumes | Influent Cu | Effluent Cu |
|---|---|---|
| 42 | 7.2 | <0.1 |
| 58 | — | <0.1 |
| 66 | — | <0.1 |
| 83 | — | <0.1 |
| 135 | 9.8 | <0.1 |

TABLE 4-continued

| Bed Volumes | Influent Cu | Effluent Cu |
|---|---|---|
| 151 | — | — |
| 167 | 8.1 | <0.1 |
| 183 | — | — |
| 199 | — | — |
| 215 | — | <0.1 |
| 231 | — | — |
| 247 | — | <0.1 |
| 263 | 7.4 | <0.1 |
| 303 | — | <0.1 |
| 323 | 7.1 | — |
| 343 | — | <0.1 |
| 363 | — | — |
| 379 | — | <0.1 |
| 427 | — | <0.1 |
| 443 | — | <0.1 |
| 491 | — | <0.1 |
| 497 | — | <0.1 |
| 553 | — | <0.1 |
| 569 | — | 0.70 |
| 617 | — | 1.20 |
| 649 | — | <0.1 |
| 665 | — | <0.1 |
| 681 | 7.7 | <0.1 |

A slurry with copper and no additive was tested to investigate if the resin could remove copper from a slurry solution without any additional complexing agents.

The feed for this test was prepared by adding copper sulfate only to the "B" slurry. No ammonium citrate was added.

General Characteristics: 0.6"×24" glass column, 15" of conditioned resin.

Table 5 summarizes the analytical results of this test.

TABLE 5

| Bed Volumes | Influent Cu | Effluent Cu |
|---|---|---|
| 8.5 | 9.2 | 0.18 |
| 17 | — | 1.16 |
| 34 | — | 2.33 |
| 68 | 9.9 | 2.34 |
| 84 | — | 2.41 |
| 100 | 8.4 | — |
| 116 | — | 2.53 |
| 132 | — | — |
| 148 | 10.3 | 0.67 |
| 164 | — | 0.73 |
| 204 | — | 1.2 |
| 228 | — | 1.67 |
| 248 | — | 1.61 |
| 284 | — | 1.05 |
| 300 | — | 1.16 |
| 348 | — | 1.39 |
| 356 | — | 1.29 |
| 372 | — | 1.48 |
| 420 | — | 0.98 |
| 468 | — | 1.52 |
| 484 | 8.21 | 2.47 |

The results showed an early break through of copper which was identified as caused by the presence of residual EDTA (ethylenediaminetetraacetic acid).

A different slurry feed was tested to investigate the effects of different slurry feed. "C" manufacturer slurry sample spiked with copper sulfate was used.

General Characteristics: 0.6"×24" glass column, 15" of conditioned resin.

Table 6 summarizes the analytical results of this test.

TABLE 6

| Bed Volumes | Influent Copper | Effluent Copper |
|---|---|---|
|  | 21.5 | — |
| 16 | — | 10.9 |
| 32 | — | 10.3 |
| 56 | — | 9.47 |
| 76 | — | 17 |
| 96 | — | — |
| 112 | — | 18 |

The effectiveness of the same resin in hydrogen form was investigated on a pH-adjusted sample. The resin was conditioned as described below.

Backwash for 30 minutes to classify resin

Sulfuric Acid—6 lbs/ft$^3$

Rinse with 20 bed volumes deionized water

The feed for this test was a "C" manufacturer slurry sample pH adjusted to 2 s.u. with sulfuric acid to pH 4.

General Characteristics: 0.6"×24" glass column, 15" of resin conditioned into the Di Hydrogen Form.

Table 7 summarizes the analytical results of this test.

TABLE 7 pH adjusted

| Bed Volumes | Influent Copper | Effluent Copper |
|---|---|---|
|  | 2.2 | — |
| 10 | — | 0.11 |
| 20 | — | 0.11 |
| 40 | — | 0.10 |
| 60 | — | 0.07 |
| 150 | — | 0.09 |
| 180 | — | 0.07 |
| 210 | — | 0.06 |
| Spike remaining Sample | 7.8 | — |
| 242 | — | 0.14 |
| 258 | — | 0.21 |
| 304 | — | 0.20 |
| 420 | — | 0.2 |
| Sample Ran Out |  |  |

The results of Table 7 showed that at 420 bed volumes, the process and apparatus of the present invention wee working successfully.

Figure 9:
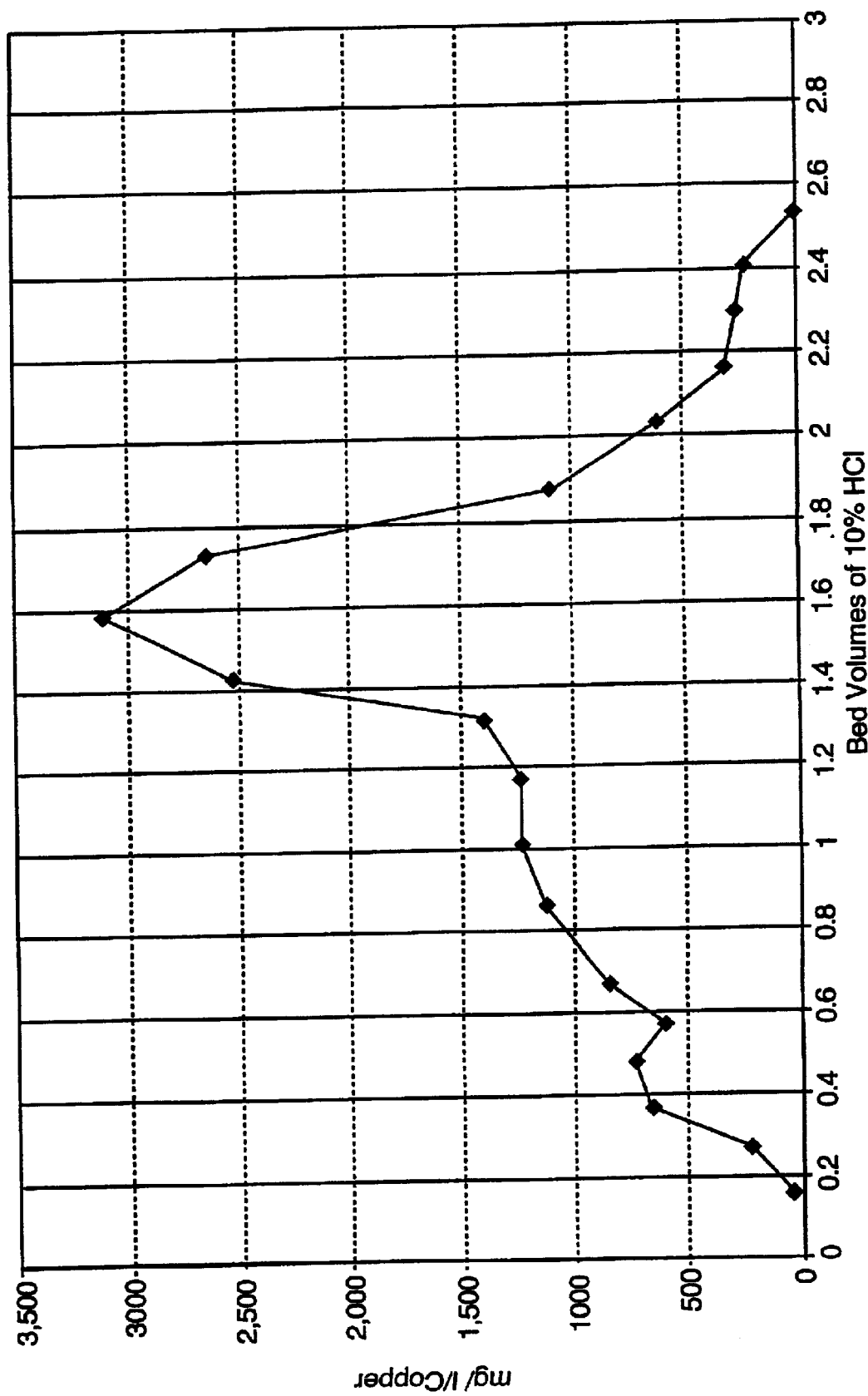
FIG. 9 is a graphical depiction of a regeneration curve for the process and apparatus of the present invention.

As a result of an incomplete sample volume, the exhaustion run was terminated and 31.4 ml of the 54 ml of resin as removed for regeneration. The results are shown in FIG. 9 which depict an efficient regeneration of the 31.4 ml of resin wit 10% HCl. Approximately 100% of the loaded copper was recovered.

The feed for this test was a "B" manufacturer slurry sample permeate (0.02 micron filtrate). The sample was spiked with 17 mg/l using copper sulfate-pentahydrate.

Table 8 summarizes the analytical results of this test.

TABLE 8

| Bed Volumes | Influent Copper | Effluent Copper |
|---|---|---|
| 0 | 16.7 | — |
| 20 | — | 16 |
| 40 | — | 15.8 |

The results showed that spiked copper in the slurry passing the 0.02 micron filtrate remained solubilized.

A recycle test, diffusion head of ion exchange unit was conducted to investigate the ability of the slurry to pass through an ion exchange diffusing head without clogging over time.

The system was set up by using a peristaltic pump to recycle diluted "B" slurry to a 2-liter glass beaker. The slurry would travel from the beaker through the peristaltic pump, through a pressure gauge, through the diffusion head, and back to the beaker.

After 24 hours of operation, there was no increase in pressure noticed, although a small amount of settled feed was found in the diffusion head.

A series of slurry agitation tests were performed to characterize the effect of slight, moderate, and severe agitation of the slurry samples. Filter pore sizes were 0.45 micron, 0.22 micron, and 0.10 micron. Results are shown in Table 9.

TABLE 9

Feed Copper: 6 mg/l

| Blender Agitation | Copper mg/l 0.45 micron | Copper mg/l 0.22 micron | Copper mg/l 0.10 micron |
|---|---|---|---|
| 0 minutes | 0.53 | 0.50 | 0.50 |
| 5 minutes | 0.56 | 0.52 | 0.50 |
| 10 minutes | 0.58 | 0.55 | 0.54 |

A pH vs. Soluble Copper test was performed to identify the level of soluble copper in solution at varied pH's. Results are shown in Table 10.

TABLE 10 pH vs. Soluble Copper

| Chemical | pH | Copper (mg/l) 0.45 micron filter |
|---|---|---|
| Sulfuric acid | 4 | 0.9 |
| Sulfuric acid | 3 | 5.2 |
| Sulfuric acid | 2.5 | 15.7 |
| Sulfuric acid | 2 | 17.3 |
| Sulfuric acid | 1.5 | 17.6 |
| Sulfuric acid | 1 | 17.6 |
| Sulfuric acid/NaOH | 3 | 17.3 |
| Sulfuric acid/NaOH | 4 | 13.8 |
| Sulfuric acid/NaOH | 5 | 6.8 |
| Sulfuric acid/NaOH | 9.5 | 0.79 |

EXAMPLE III

A column was partially loaded with copper from a CMP slurry. Because of an insufficient sample to allow for complete loading, a regeneration was conducted on the partially loaded column. The results of Example II had indicated that the use of sulfuric acid is only partially effective and can lead to clumping of the resin. Hydrochloric acid was used for procedure.

The resin from the top 7.0 inches of a partially loaded column was removed by siphon and loaded into another column. The following is the data for the "new" column used in the regeneration.

| Column width: | 0.59 inches |
|---|---|
| Column length: | 12 inches |
| Bed depth: | 7.0 inches |
| Bed volume: | 31.36 ml |
| Bed volume: | 0.00111 ft$^3$ |

A 10% HCl solution was used for the regeneration of the ion exchange column. The test was run for 60 minutes at an average flow rate of 1.39 ml/min. A total volume of 83.4 ml or 2.65 Bed Volumes (Bv) was processed through the column. The at was stopped after a low level of copper was detected. Data are shown in Tables 11 and 12, and a regeneration curve is shown in FIG. 9.

The regeneration process involved draining the "new" column of the deionized (DI) water contained within the column. The HCl solution was then pumped into the column up-flow at a rate of 3–4 ml per minute until the effluent reached the end of the tubing. At this point, the flow rate was adjusted to approximately 0.3 BV/ft$^3$.

TABLE 11

| Bed Volumes | Copper |
|---|---|
| 0.16 | 53 |
| 0.27 | 230 |
| 0.37 | 665 |
| 0.48 | 730 |
| 0.57 | 597 |
| 0.67 | 850 |
| 0.86 | 1125 |
| 1.01 | 1230 |
| 1.17 | 1230 |
| 1.32 | 1390 |
| 1.43 | 2530 |
| 1.59 | 3110 |
| 1.74 | 2655 |
| 1.88 | 1085 |
| 2.03 | 620 |
| 2.16 | 315 |
| 2.29 | 270 |
| 2.41 | 233 |
| 2.53 | 9 |

TABLE 12

| IX (H+)(54 (54 mls/bv) | Influent | Effluent | Loaded (mg) | Loaded (#/ft3) | Corrected during regen |
|---|---|---|---|---|---|
| 0 | 2.2 | — | | | |
| 10 | 2.2 | 0.11 | 1.1 | 0.001 | 0.0022396 |
| 20 | 2.2 | 0.11 | 2.3 | 0.004 | 0.0067187 |
| 40 | 2.2 | 0.1 | 4.5 | 0.009 | 0.0157197 |
| 60 | 2.2 | 0.07 | 6.9 | 0.017 | 0.0294142 |
| 150 | 2.2 | 0.09 | 17.1 | 0.037 | 0.063329 |
| 180 | 2.2 | 0.07 | 20.7 | 0.061 | 0.1044124 |
| 210 | 2.2 | 0.06 | 24.3 | 0.089 | 0.1525682 |
| 240 | 7.8 | 0.1 | 99.8 | 0.205 | 0.3505917 |
| 320 | 7.8 | 0.14 | 132.4 | 0.358 | 0.6132516 |
| 380 | 7.8 | 0.21 | 155.7 | 0.539 | 0.9223098 |
| 420 | 7.8 | 0.2 | 172.4 | 0.739 | 1.2643505 |

Sample exhausted

| IX Resin: | Chelate | | | |
|---|---|---|---|---|
| Regeneration: | 10% HCl | | | |
| Bed Volume: | 31.36 mls. | | | |
| Bed Volume: | 0.00111 ft3 | | | |
| Total Copper Load- | 1.264 #/ft3 (adjusted to account for the vol. of resin used for reg'n.) | | | |
| Total Copper Re- | 1.271 #/ft3 | | | |
| Copper Recovered | 100.6% | | | |
| Time [minutes] | BV | Flow Rate (ml/min.) | Copper in Regen (mg/l) | Total Copper Removed (#/ft3) |
| 3 | 0.16 | 1.7 | 53 | 0.003 |
| 6 | 0.27 | 1.1 | 230 | 0.015 |
| 9 | 0.37 | 1.1 | 665 | 0.050 |
| 12 | 0.48 | 1.1 | 730 | 0.090 |
| 15 | 0.57 | 1.0 | 597 | 0.120 |
| 18 | 0.67 | 1.0 | 850 | 0.166 |
| 21 | 0.86 | 2.0 | 1,125 | 0.275 |
| 24 | 1.01 | 1.6 | 1,230 | 0.367 |
| 27 | 1.17 | 1.6 | 1,230 | 0.458 |
| 30 | 1.32 | 1.6 | 1,390 | 0.558 |
| 33 | 1.43 | 1.2 | 2,530 | 0.696 |
| 36 | 1.59 | 1.6 | 3,110 | 0.920 |
| 39 | 1.74 | 1.6 | 2,655 | 1.109 |
| 42 | 1.88 | 1.5 | 1,085 | 1.181 |
| 45 | 2.03 | 1.5 | 620 | 1.222 |
| 48 | 2.16 | 1.4 | 315 | 1.241 |
| 51 | 2.29 | 1.3 | 270 | 1.257 |
| 54 | 2.41 | 1.3 | 233 | 1.270 |
| 60 | 2.53 | 1.2 | 9 | 1.271 |

FIG. 9 is a graphical depiction of a regeneration curve for the process and apparatus of the present invention.

The novel process and apparatus of the present invention have applications to the attachment and removal of metal ions other than copper from chemical planarization wastewater solutions. The novel process and apparatus of the present invention have applications to the attachment and removal of metal ions such as copper, vanadium, uranium, lead, nickel, cadmium, iron, beryllium, manganese, calcium, magnesium, strontium, barium, and sodium.

The process and apparatus of the present invention remove metal from wastewater by providing a carbon bed for receiving a wastewater feed containing metal ions in solution, wherein the wastewater feed contains solids sized in the range of about 0.01–1.0 μm in an amount higher than about 50 mg/l, in combination with providing a ion exchange unit operation for receiving a carbon bed product stream from the carbon bed and for removing the metal ions from solution. The process and apparatus of the present invention remove metal ions from wastewater containing solids in an amount higher than about 100 mg/l, e.g., by way of example in an amount in the range of about 500–2000 mg/l.

A wastewater feed containing hydrogen peroxide and metal ions in solution is passed to the carbon column to reduce the concentration of the hydrogen peroxide and form a carbon bed effluent having concentration levels of hydrogen peroxide, preferably to a level less than about 0.1 mg/l (0.1 ppm). In one aspect, the metal ions are copper ions. In one aspect, the metal ions are copper ions at a concentration level in the range of about 1–100 mg/l.

In one aspect, the ion exchange unit operation includes means for contacting metal ions in the carbon bed product stream with a resin having a macroporous iminodiacetic functional group to attach the copper ions. In one aspect, the ion exchange unit operation includes means for contacting metal ions in the carbon bed product stream with a resin having a cross-linked polystyrene resin to attach the copper ions. In one embodiment, the cross-linked polystyrene resin has a bead size in the range of about 0.4 to 1.23 mm.

The process and apparatus of the present invention operate to remove metal ions from a wastewater from a byproduct polishing slurry. In one embodiment, the process and apparatus of the present invention operate to remove metal ions, e.g., such as copper metal ions, from a wastewater from a byproduct polishing slurry from the chemical mechanical polishing (CMP) of integrated circuits to attach the metal ions and form an environmentally clean water discharge product. By environmentally clean is meant a wastewater discharge stream to a municipal wastewater treatment plant such that the wastewater discharge stream contains copper ions in a concentration less than about 0.5 mg/l (500 ppm)

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A system for treating a slurry stream, comprising:

a chemical mechanical polishing unit comprising a source of a chemical mechanical polishing effluent comprising the slurry stream;

a carbon bed connected directly to said source of the chemical mechanic polishing effluent, said carbon bed comprising an activated carbon; and an ion exchange unit connected directly to said carbon bed, said ion exchange unit comprising chelating ion exchange resin.

2. The system as set forth in claim 1, wherein the slurry stream contains solids in an amount higher than about 100 mg/l.

3. The system as set forth in claim 1, wherein the slurry stream contains hydrogen peroxide.

4. The system as set forth in claim 3, wherein the slurry stream comprises metal ions.

5. The system as set forth in claim 4, wherein said chelating ion exchange resin comprises an iminodiacetic functional group.

6. The system as set forth in claim 4, wherein said chelating ion exchange resin comprises cross-linked polystyrene resin.

7. The system as set forth in claim 6, wherein said chelating ion exchange resin comprises cross-linked polystyrene resin having a bead size in the range of about 0.4 to 1.23 mm with a uniformity coefficient of about 1.7.

* * * * *

UNITED STATES PATENT AND TRADEMARK OFFICE
CERTIFICATE OF CORRECTION

PATENT NO.   : 6,818,129 B2
DATED        : November 16, 2004
INVENTOR(S)  : James L. Filson et al.

It is certified that error appears in the above-identified patent and that said Letters Patent is hereby corrected as shown below:

Title page,
Item [75], Inventors, delete "Stanley R. Kaars" and insert -- Stanley R. Karrs --

Signed and Sealed this

First Day of March, 2005

JON W. DUDAS
*Director of the United States Patent and Trademark Office*